US012394085B2

(12) United States Patent
Chen et al.

(10) Patent No.: US 12,394,085 B2
(45) Date of Patent: Aug. 19, 2025

(54) LONG RANGE DISTANCE ESTIMATION USING REFERENCE OBJECTS (71) Applicant: Waymo LLC, Mountain View, CA (US)

(72) Inventors: Yu-Han Chen, Sunnyvale, CA (US); Maya Kabkab, Palo Alto, CA (US); Ruichi Yu, Mountain View, CA (US); Yingwei Li, Baltimore, MD (US); Hang Zhao, Sunnyvale, CA (US); Yu Ouyang, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 505 days.

(21) Appl. No.: 17/526,682

(22) Filed: Nov. 15, 2021

(65) Prior Publication Data
US 2022/0156972 A1 May 19, 2022

Related U.S. Application Data (60) Provisional application No. 63/114,518, filed on Nov. 16, 2020.

(51) Int. Cl.
G06T 7/73 (2017.01)
G01S 17/89 (2020.01)
G06N 3/04 (2023.01)

(52) U.S. Cl.
CPC .............. *G06T 7/74* (2017.01); *G01S 17/89* (2013.01); *G06N 3/04* (2013.01); *G06T 2207/20084* (2013.01)

(58) Field of Classification Search
CPC ........ G01S 17/86; G01S 17/89; G01S 17/931; G06N 3/04; G06N 3/045; G06N 3/048;
(Continued)

(56) References Cited

U.S. PATENT DOCUMENTS 10,620,317 B1 * 4/2020 Chai .................... G06T 7/70
11,004,348 B1 * 5/2021 Lahr .................... G08G 5/53
(Continued)

FOREIGN PATENT DOCUMENTS

| CN | 101297319 A | 10/2008 |
| CN | 110059608 A | 7/2019 |
| JP | 2009-186260 A | 8/2009 |

OTHER PUBLICATIONS

Blanco et al., "Visual performance during nighttime driving in fog," Technical report, Dec. 2005, FHWAHRT-04-137, 114 pages.
(Continued)

*Primary Examiner* — Tsung Yin Tsai
(74) *Attorney, Agent, or Firm* — Fish & Richardson P.C.

(57) ABSTRACT

Methods, computer systems, and apparatus, including computer programs encoded on computer storage media, for generating a distance estimate for a target object that is depicted in an image of a scene in an environment. The system obtains data specifying (i) a target portion of the image that depicts the target object detected in the image, and (ii) one or more reference portions of the image that each depict a respective reference object detected in the image. The system further obtains, for each of the one or more reference objects, a respective distance measurement for the reference object that is a measurement of a distance from the reference object to a specified location in the environment. The system processes the obtained data to generate a distance estimate for the target object that is an estimate of a distance from the target object to the specified location in the environment.

17 Claims, 5 Drawing Sheets (58) Field of Classification Search
CPC ............ G06N 3/08; G06T 2207/10028; G06T 2207/20084; G06T 2207/30252; G06T 7/74; G06V 10/82; G06V 20/58
See application file for complete search history.

(56) References Cited

U.S. PATENT DOCUMENTS

| | | | | |
|---|---|---|---|---|
| 2011/0255741 | A1* | 10/2011 | Jung | G06V 20/58 382/103 |
| 2017/0278289 | A1* | 9/2017 | Marino | G06T 7/536 |
| 2017/0371348 | A1* | 12/2017 | Mou | G05D 1/0257 |
| 2018/0316873 | A1* | 11/2018 | Wei | G08G 1/167 |
| 2019/0019318 | A1 | 1/2019 | Cinnamon et al. | |
| 2019/0108679 | A1* | 4/2019 | Wang | G06T 7/344 |
| 2019/0147335 | A1* | 5/2019 | Wang | G06F 18/251 706/20 |
| 2019/0147600 | A1* | 5/2019 | Karasev | G06V 10/764 382/107 |
| 2019/0325243 | A1 | 10/2019 | Sikka et al. | |
| 2020/0005485 | A1* | 1/2020 | Xu | G01S 13/931 |
| 2020/0074674 | A1 | 3/2020 | Guo et al. | |
| 2020/0139967 | A1* | 5/2020 | Beller | G05D 1/81 |
| 2021/0181745 | A1* | 6/2021 | Liu | G05D 1/246 |
| 2022/0319312 | A1* | 10/2022 | Mintz | G06Q 30/0224 |

OTHER PUBLICATIONS blog.waymo.com [online], "Introducing the 5th-generation Waymo Driver: Informed by experience, designed for scale, engineered to tackle more environments," Mar. 2020, retrieved on Nov. 17, 2021, retrieved from URL<https://blog.waymo.com/search?q=5th+Generation+Self-Driving>, 6 pages.
Caesar et al., "nuScenes: A multimodal dataset for autonomous driving," Proceedings of the IEEE/CVF Conference on Computer Vision and Pattern Recognition, 2020, pp. 11621-11631.
Chen et al., "Monopair: Monocular 3D object detection using pairwise spatial relationships," Proceedings of the IEEE/CVF Conference on Computer Vision and Pattern Recognition, 2020, pp. 12093-12102.
Criminisi et al., "Single view metrology," International Journal of Computer Vision, Nov. 2000, 40(2):123-148.
Drucker et al., "Support vector regression machines," Advances in Neural Information Processing Systems, 1997, 9:155-161.
Eigen et al., "Depth map prediction from a single image using a multi-scale deep network," CoRR, Jun. 2014, arxiv.org/abs/1406.2283, 9 pages.
fmcsa.dot.gov [online], "Long Stopping Distances," Nov. 2016, retrieved on Nov. 17, 2021, retrieved from URL<https://www.fmcsa.dot.gov/ourroads/long-stopping-distances/>, 2 pages.
Gao et al., "VectorNet: Encoding HD maps and agent dynamics from vectorized representation," Proceedings of the IEEE/CVF Conference on Computer Vision and Pattern Recognition, 2020, pp. 11525-11533.
Garg et al., "Unsupervised CNN for single view depth estimation: Geometry to the rescue," European Conference on Computer Vision, Sep. 2016, pp. 740-756.
Geiger et al., "Vision meets robotics: The Kitti dataset," International Journal of Robotics Research, Aug. 2013, 7 pages.
Geirhos et al., "Shortcut learning in deep neural networks," CoRR, Mar. 2021, arXiv:2004.07780, 29 pages.
Girshick et al., "Fast R-CNN," Proceedings of the IEEE International Conference on Computer Vision, 2015, pp. 1440-1448.
Godard et al., "Digging into self-supervised monocular depth estimation," Proceedings of the IEEE/CVF International Conference on Computer Vision, 2019, pp. 3828-3838.
Gokce et al., "Vision-based detection and distance estimation of micro unmanned aerial vehicles," Sensors, Sep. 2015, 15(9):23805-23846.
Goyal et al., "Accurate, large minibatch SGD: Training ImageNet in 1 hour," CoRR, Apr. 2018, arXiv:1706.02677, 12 pages.
Granrud et al., "A comparison of monocular and binocular depth perception in 5-and 7-month-old infants," Journal of Experimental Child Psychology, Aug. 1984, 38(1):19-32.
Haseeb et al., "DisNet: A novel method for distance estimation from monocular camera," 10th Planning, Perception and Navigation for Intelligent Vehicles, 2018, 6 pages.
He et al., "Deep residual learning for image recognition," Proceedings of the IEEE Conference on Computer Vision and Pattern Recognition, 2016, pp. 770-778.
He et al., "Mask R-CNN," Proceedings of the IEEE International Conference on Computer Vision, 2017, pp. 2961-2969.
Hu et al., "Squeeze-and-excitation networks," Proceedings of the IEEE Conference on Computer Vision and Pattern Recognition, 2018, pp. 7132-7141.
Huber et al., "Robust estimation of a location parameter," Breakthroughs in Statistics, 1992, pp. 492-518.
Hung et al., "Soda: Multi-object tracking with soft data association," CoRR, Aug. 2020, arXiv:2008.07725, 13 pages.
Khamis et al., "Stereonet: Guided hierarchical refinement for real-time edge-aware depth prediction," Proceedings of the European Conference on Computer Vision, 2018, pp. 573-590.
Lee et al., "Monocular depth estimation using relative depth maps," Proceedings of the IEEE/CVF Conference on Computer Vision and Pattern Recognition, 2019, pp. 9729-9738.
Lei Ba et al., "Layer normalization," CoRR, Jul. 2016, arXiv:1607.06450, 14 pages.
Li et al., "Context-aware group captioning via self-attention and contrastive features," Proceedings of the IEEE/CVF Conference on Computer Vision and Pattern Recognition, 2020, pp. 3440-3450.
Li et al., "Neural architecture search for lightweight non-local networks," Proceedings of the IEEE/CVF Conference on Computer Vision and Pattern Recognition, 2020, pp. 10297-10306.
Li et al., "Shapetexture debiased neural network training," CoRR, Mar. 2021, arXiv:2010.05981, 12 pages.
Liu et al., "Learning depth from single monocular images using deep convolutional neural fields," IEEE Transactions on Pattern Analysis and Machine Intelligence, Oct. 2016, 38(10):2024-2039.
Liu et al., "Quality aware network for set to set recognition," Proceedings of the IEEE Conference on Computer Vision and Pattern Recognition, 2017, pp. 5790-5799.
Liu et al., "Smoke: Single-stage monocular 3D object detection via keypoint estimation," Proceedings of the IEEE/CVF Conference on Computer Vision and Pattern Recognition (CVPR) Workshops, 2020, pp. 996-997.
Loshchilov et al., "Sgdr: Stochastic gradient descent with warm restarts," CoRR, May 2017, arxiv.org/abs/1608.03983, 16 pages.
Ma et al., "Rethinking pseudo-LiDAR representation," CoRR, Aug. 2020, arXiv:2008.04582, 21 pages.
Nair et al., "Rectified linear units improve restricted Boltzmann machines," Proceedings of the 27th International Conference on Machine Learning, 2010, 8 pages.
Poggi et al., "Guided stereo matching," Proceedings of the IEEE/CVF Conference on Computer Vision and Pattern Recognition, 2019, pp. 979-988.
Qi et al., "Distance estimation of monocular based on vehicle pose information," Journal of Physics: Conference Series, 2019, J. Phys. Conf. Ser., 1168:032040.
Scheiner et al., "Seeing around street corners: Non-line-of-sight detection and tracking inthe-wild using doppler radar," Proceedings of the IEEE/CVF Conference on Computer Vision and Pattern Recognition, 2020, pp. 2068-2077.
Shi et al., "Pointrcnn: 3D object proposal generation and detection from point cloud," Proceedings of the IEEE/CVF Conference on Computer Vision and Pattern Recognition, 2019, pp. 770-779.
Shu et al., "Feature-metric loss for self-supervised learning of depth and egomotion," European Conference on Computer Vision, Nov. 2020, 16 pages.
siam.org [online], "A Multigrid Tutorial, Second Edition," 2000, retrieved on Feb. 3, 2022, retrieved from URL<https://epubs.siam.org/doi/book/10.1137/1.9780898719505/>, 6 pages.

(56) References Cited

OTHER PUBLICATIONS

Song et al., "End-to-end learning for inter-vehicle distance and relative velocity estimation in ADAS with a monocular camera," 2020 IEEE International Conference on Robotics and Automation (ICRA), Sep. 2020, 7 pages.
Sun et al., "Scalability in perception for autonomous driving: Waymo open dataset," Proceedings of the IEEE/CVF Conference on Computer Vision and Pattern Recognition, 2020, pp. 2446-2454.
Szeliski, "Fast surface interpolation using hierarchical basis functions," IEEE Transactions on Pattern Analysis and Machine Intelligence, Jun. 1990, 12(6):513-528.
Szeliski, "Locally adapted hierarchical basis preconditioning," SIGGRAPH '06: ACM SIGGRAPH, Jul. 2006, 25(3):1135-1143.
Tuohy et al., "Distance determination for an automobile environment using inverse perspective mapping in OpenCB," In IET Irish Signals and Systems Conference, 2010, pp. 100-105.
Vaswani et al., "Attention is all you need," Advances in Neural Information Processing Systems 30, 2017, 11 pages.
Velodynelidar.com [online], "Alpha Prime," Jan. 2020, retrieved on Nov. 17, 2021, retrieved from URL<https://velodynelidar.com/products/alpha-prime/>, 8 pages.
Vyas et al., "Out-of-distribution detection using an ensemble of self-supervised leave-out classifiers," Proceedings of the European Conference on Computer Vision, 2018, pp. 550-564.
Wang et al., "Axial-DeepLab: Standalone axial-attention for panoptic segmentation," European Conference on Computer Vision, Oct. 2020, 26 pages.
Wang et al., "Non-local neural networks," Proceedings of the IEEE Conference on Computer Vision and Pattern Recognition, 2018, pp. 7794-7803.
Wang et al., "Pseudo-LiDAR from visual depth estimation: Bridging the gap in 3D object detection for autonomous driving," Proceedings of the IEEE/CVF Conference on Computer Vision and Pattern Recognition, 2019, pp. 8445-8453.
Wang et al., "What makes training multi-modal classification networks hard?," Proceedings of the IEEE/CVF Conference on Computer Vision and Pattern Recognition, 2020, pp. 12695-12705.
Weng et al., "GNN3DMOT: Graph neural network for 3d multi-object tracking with 2d-3d multi-feature learning," Proceedings of the IEEE/CVF Conference on Computer Vision and Pattern Recognition, 2020, pp. 6499-6508.
Xu et al., "Show, attend and tell: Neural image caption generation with visual attention," Proceedings of the 32nd International Conference on Machine Learning, 2015, 37:2048-2057.
Yang et al., "Hierarchical attention networks for document classification," Proceedings of NAACL-HLT, 2016, pp. 1480-1489.
Yao et al., "Exploring visual relationship for image captioning," Proceedings of the European Conference on Computer Vision, 2018, pp. 684-699.
Zhang et al., "Depth sensing beyond LiDAR range," Proceedings of the IEEE/CVF Conference on Computer Vision and Pattern Recognition, 2020, pp. 1692-1700.
Zhou et al., "End-to-end multi-view fusion for 3D object detection in LiDAR point clouds," Proceedings of the Conference on Robot Learning, 2020, 100:923-932.
Zhou et al., "Multi-scale attentional network for multi-focal segmentation of active bleed after pelvic fractures," International Workshop on Machine Learning in Medical Imaging, Oct. 2019, pp. 461-469.
Zhou et al., "Objects as Points," CoRR, Apr. 2019, arXiv:1904.07850, 12 pages.
Zhu et al., "Learning object-specific distance from a monocular image," Proceedings of the IEEE/CVF International Conference on Computer Vision, 2019, pp. 3839-3848.
Office Action in Chinese Appln. No. 202111353626.7, mailed on Feb. 22, 2025, 22 pages (with English translation).

* cited by examiner

LONG RANGE DISTANCE ESTIMATION USING REFERENCE OBJECTS

CROSS-REFERENCE TO RELATED APPLICATION

This application claims priority to U.S. Provisional Patent Application No. 63/114,518, filed on Nov. 16, 2020, the disclosure of which is hereby incorporated by reference in its entirety.

BACKGROUND

This specification relates to using neural networks to estimate distances to objects in an environment, also referred to as localizing objects in the environment. Localizing objects in an environment is a task required for motion planning, e.g., by an autonomous vehicle.

Autonomous vehicles include self-driving cars, boats, and aircraft. Autonomous vehicles use a variety of onboard sensors and computer systems to detect nearby objects and use such detections to make control and navigation decisions.

Estimating the respective distances of objects, such as other vehicles or pedestrians, from the autonomous vehicle is a safety-critical task for autonomous driving. Although many autonomous vehicles are equipped with LiDAR sensors that can make distance measurements, some objects that are detected in an image generated by the camera sensor of the autonomous vehicle can be outside of the sensing range of the LiDAR sensors of the autonomous vehicle.

SUMMARY

This specification describes a system implemented as computer programs on one or more computers in one or more locations that performs object localization by using neural networks to estimate distances to objects in an environment, also referred to as localizing objects in the environment.

For example, the object localization may be performed by an on-board computer system of an autonomous vehicle navigating through the environment using images, and optionally, other data, generated by one or more sensors of the autonomous vehicle, e.g., a camera sensor and, optionally, a LiDAR sensor. A planning system of the vehicle can use the object localizations to make planning decisions to plan a future trajectory of the vehicle, e.g., by generating or modifying the future trajectory to avoid collisions with any of the objects.

In particular, the system determines a distance estimate for a target object that is depicted in an image along with one or more reference objects. For example, the system can apply an object detector to the image to determine that the image depicts the target object and the one or more reference objects.

The system obtains data specifying (i) a target portion of the image that depicts the target object detected in the image, (ii) one or more reference portions of the image that each depict a respective reference object detected in the image.

The system obtains, for each of the one or more reference objects, a respective distance measurement for the reference object that is a measurement of a distance from the reference object to a specified point in the environment. For example, these measurements can be obtained using a LiDAR sensor of the autonomous vehicle or from a map of the environment maintained by the autonomous vehicle. Thus, the distances of the reference objects are known while the distance of the target object is not.

The system generates a network input from the portion of the image that depicts the target object, the respective portions of the image that depict each of the one or more reference objects, and the respective distance measurements for the reference objects.

The system then processes the network input using a neural network to generate a distance estimate for the target object that is an estimate of a distance from the target object to the specified point in the environment. Thus, the system uses known distances to reference objects and relationships between the reference objects and the target object in order to accurately estimate the distance to the target object.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that performs object localization by using neural networks to estimate distances to objects in an environment, also referred to as localizing objects in the environment.

The subject matter described in this specification can be implemented in particular embodiments so as to realize one or more of the following advantages.

Estimating the distance of objects is a safety-critical task for applications such as robotic control and autonomous driving. For example, estimating the distance of long-range objects, such as objects beyond a typical LiDAR range, is necessary for scenarios such as freeway driving, heavy-duty truck driving, and wet road driving. For example, on rural highways with a standard speed limit, it may take a passenger vehicle a large distance to come to a complete stop in an emergency. This large distance can in some cases greatly exceed the typical LiDAR sensing range. Thus, sensing the distance to objects outside of the LiDAR sensing range can be important even for passenger vehicles travelling in good road conditions. The required stopping distance grows significantly with a heavy load truck or in bad road conditions such as snow, ice, or rain. Given that sudden breaking on freeways can be unsafe, it remains critical to estimate the distance of objects beyond the minimum required stopping distance in order to provide enough time for a gradual slow-down or a lane change. Therefore, to allow sufficient time for an appropriate reaction and to ensure safety, autonomous driving systems are required to estimate the distance to long-range objects.

Most existing LiDAR technologies do not meet long-range sensing requirements. Cameras, on the other hand, sense objects at a longer range and capture rich semantic information such as object appearance, geometry, and contextual hints. However, camera images do not, in and of themselves, provide depth information. Conventional methods have been developed to estimate the distance of objects based on camera images. However, these approaches tend to yield inaccurate results on long-range objects due to challenges such as errors in size estimation and lack of context or other relevant signals in the scene.

This specification provides techniques that utilize reference objects with known distance measurements for long-range distance estimation. The provided system uses a machine-learning model to localize a long-range target object given references with known distances. The reference distances can be obtained for certain other objects in the scene whose distances are readily available, such as objects within the sensing range of the LiDAR sensor, or objects that can be localized using an available map.

In some implementations, by generating pair embeddings between the target object and reference objects, the provided system efficiently encodes and utilizes relationships between the target and reference objects. This is in contrast with conventional methods that emphasize object size and appearance for distance estimation, which tend to be less informative cues for long-range objects.

In some implementations, the provided system further processes the target-reference pair embeddings using an attention module that fuses information from different reference objects, and processes the combined target-reference pair embeddings using neural network layers to generate the target distance estimate. This approach takes into account both global and local features of the target-reference relationships, as well as the relevance of different reference objects for distance estimation, and thus further improves the performance of the system.

Overall, the techniques adopted by the provided system significantly improve the accuracy of distance estimation of a long-range target object over conventional methods without needing additional special hardware beyond typical existing sensors (e.g., sensors configured on an autonomous vehicle), such as a camera and a LiDAR sensor.

Other advantages of the subject matter will become apparent from the description below, the drawings, and the claims.

Figure 1:
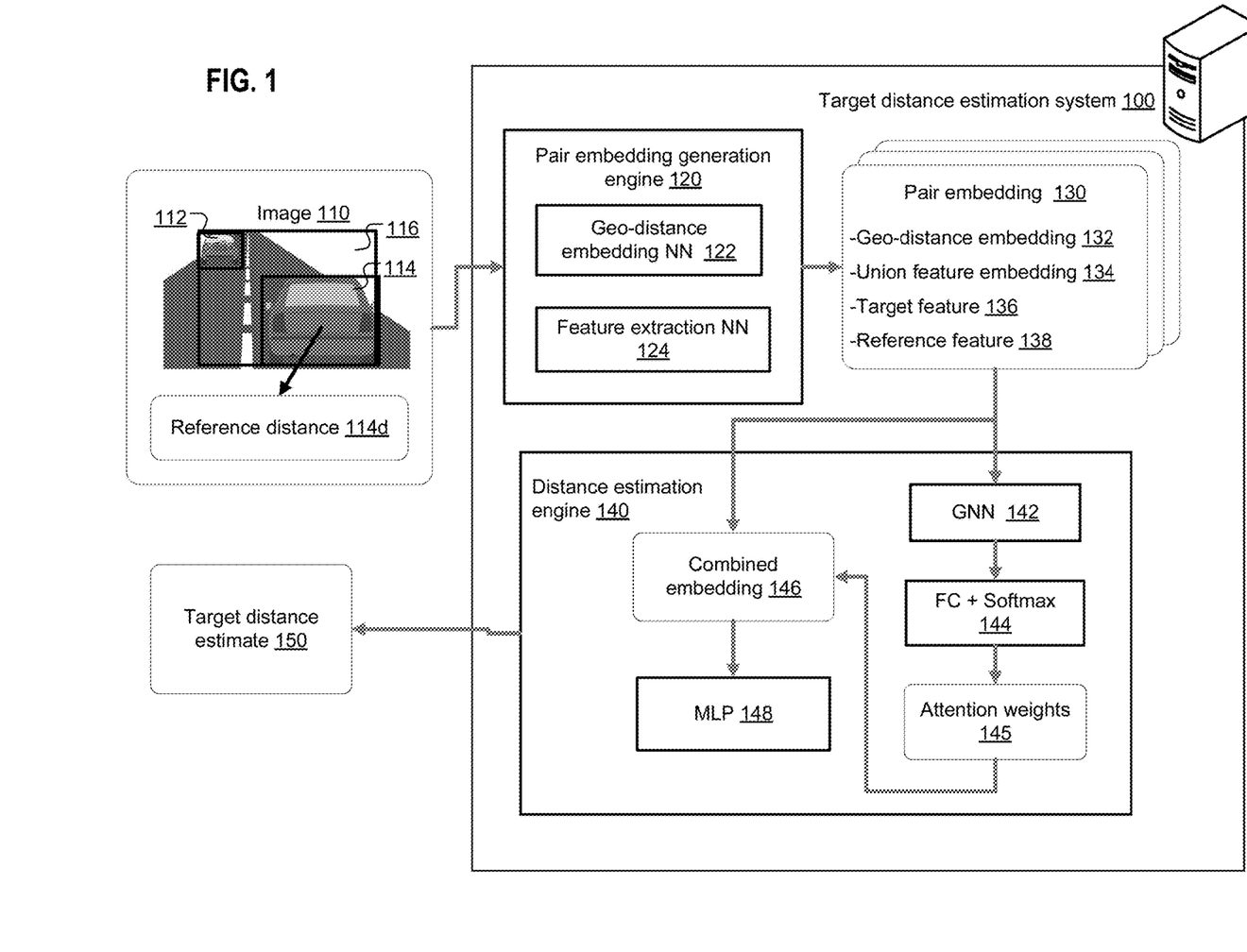
FIG. 1 shows an example target distance estimation system.

FIG. 1 shows an example of a target distance estimation system 100. The system 100 is an example of a system implemented as computer programs on one or more computers in one or more locations, in which the systems, components, and techniques described below can be implemented.

In general, the system 100 estimates a distance for a target object that is depicted in an image 110 of a scene in an environment. In one example, the image 110 can be an image obtained by an image sensor, e.g., by a monocular camera, deployed on an agent navigating through the environment, such as an autonomous vehicle. The system 100 estimates the distance of the target object from the autonomous vehicle (e.g., the distance between the image sensor and the target object center). A planning system of the vehicle can use the estimated target distance to make planning decisions to plan a future trajectory of the vehicle, e.g., by generating or modifying the future trajectory to avoid collisions with any of the objects. An example of an autonomous vehicle that deploys the target distance estimation system 100 is described with reference to FIG. 2. Other examples of agents include robots, drones, and so on.

As an input, the system 100 obtains data specifying (i) a target portion 112 of the image 110 that depicts the target object detected in the image, and (ii) one or more reference portions 114 of the image 110 that each depicts a respective reference object.

The target object can be a dynamic object in the environment, such as another vehicle on the road, or a particular road feature, such as a traffic light. In some implementations, the target object can be outside of the sensing range of a localization sensor, such as a LiDAR system, configured on the autonomous vehicle.

The reference objects can be other objects sharing the environment, such as other vehicles or pedestrians on the road with the autonomous vehicle, or map features such as road signs, street signs, cross-sections, landmarks, and so on. In some implementations, some or all of the reference objects can be within the sensing range of the localization sensor, such as a LiDAR system.

The system 100 or another system can detect the target object and the reference objects in the image 110 using any appropriate image-based object detection techniques, e.g., by applying a conventional object detection neural network to the image 110, and select the target portion and reference portions of the image, e.g., by obtaining respective bounding boxes of the detected target object and reference objects from the image.

The system further obtains, for each of the one or more reference objects, a respective distance measurement 114$d$ for the reference object that is a measurement of a distance from the reference object to a specified location in the environment.

In some implementations, the specified location is a location of the image sensor, e.g., a camera, that captured the image in the environment.

In some implementations, the respective distance measurements can be obtained from sensor readings of the scene in the environment, for example, having been generated by a LiDAR sensor that is also deployed on the agent.

In some implementations, some or all of the reference objects can be map features in the environment, and the respective distance measurements are obtained from map data for the scene in the environment. That is, one or more of the reference objects are objects that are identified in a map of the environment, i.e., objects whose location is indicated in the map of the environment, and the system can obtain the distance measurement by computing a distance between the specified location and the location indicated in the map for the object. For example, a reference object can be a road sign that is identified in a map of the environment, and the system can determine the distance measurement for the road sign by computing the distance from the location of the autonomous vehicle to the location that is indicated for the road sign in the map.

The system 100 can generate a network input from the portion of the image that depicts the target object 112, the respective portions of the image that depict each of the one or more reference objects 114, and the respective distance measurements for the reference objects 114$d$, and process the network input using a neural network to generate the target distance estimate 150.

In some implementations, the network input includes one or more pair embeddings 130 that each correspond to a different target-reference pair that includes the target object and one of the reference objects. In particular, the system 100 includes a pair embedding generation engine 120 to generate a respective target-reference pair embedding 130 for each target-reference pair that includes the target object and the reference object. An embedding, as used in this specification, is an ordered collection of numerical values, e.g., a vector of floating point or other types of numeric values, that has a fixed dimensionality.

In general, each target-reference pair embedding 130 can encode not only the features of the target object and the reference object, but also features of the pairwise relationship between the target object and the reference object.

For each target-reference pair, the pair embedding generation engine 120 can use a geo-distance embedding neural network 122 to generate a geo-distance embedding 132 that encodes the geo-distance relationship between the target object and the reference object. The geo-distance relationship between two objects reflects the distance relationship between the two objects, the size relationship between the two objects, or both. Concretely, the pair embedding generation engine 120 can generate an embedding input, and process the embedding input using the geo-distance embedding neural network 122 to generate the geo-distance embedding 132. The embedding input includes data indicating properties of the target portion 112 and the reference portion 114 for the reference object in the pair, as well as the distance measurement 114 for the reference object in the pair.

In some implementations, the properties indicated by the embedding input include one or more of: a relative position difference between a center of the target portion and a center of the reference portion, or a relative scale between a size of the target portion and a size of the reference portion. For example, the embedding input can include one or more of: center coordinates of the bounding boxes for the target and reference objects, the relative position difference between the center coordinates of the bounding boxes for the target and reference objects, the sizes of the bounding boxes for the target and reference objects, or the relative scale between the sizes of the bounding boxes for the target and reference objects.

The neural network 122 can have any appropriate architecture that allows the neural network to map the embedding input to an embedding. As a particular example, in some implementations, the geo-distance embedding neural network 122 for processing the embedding input to generate the geo-distance embedding is a multi-layer perceptron (MLP).

In some implementations, the pair embedding generation engine 120 can use a feature extraction neural network 124 to generate a union embedding 134 for the target-reference pair. Concretely, the pair embedding generation engine 120 identifies a union bounding box 116 that is a portion of the image that includes both the target portion and the reference portion for the reference object in the pair. The pair embedding generation engine 120 then generates the union embedding 134 by processing the portion of the image within the union bounding box 116 using the feature extraction neural network 124.

The neural network 124 can have any appropriate architecture that allows the neural network to map the union bounding box to an embedding. For example, the feature extraction neural network 124 can include a convolutional neural network. In one particular example, the pair embedding generation engine 120 processes the image 110 with a convolutional neural network (e.g., a ResNet) to generate a feature map of the image, and then processes the feature map and the union bounding box 116 with an ROIAlign operation to crop the union embedding 134 corresponding to the union bounding box 116 from the feature map. Example techniques for applying ROIAlign operation are described in "Fast R-CNN," Girshick, arXiv: 1504.08083 [cs.CV], 2015, and "Mask R-CNN", He et al., arXiv: 1703.06870 [cs.CV], 2017, the entire contents of which are hereby incorporated by references.

The pair embedding generation engine 120 can generate a pairwise embedding for the target-reference pair by combining, e.g., by concatenating, the geo-distance embedding 132 and the target-reference union embedding 134.

The pair embedding generation engine 120 can further obtain respective feature embeddings for the target object and the reference object in the target-reference pair. The target object feature embedding 136 for the target object includes features extracted from the portion of the image depicting the target object. The reference object feature embedding 138 for the reference object includes features extracted from the portion of the image depicting the reference object.

In some implementations, similar to generating the union embedding, the pair embedding generation engine 120 can process the feature map of the image 110 and the respective bounding box of the target or the reference object with the ROIAlign operation to generate the feature embedding for the target object and the reference object.

The pair embedding generation engine 120 can generate the pair embedding 130 by combining, e.g., by concatenating, the pairwise embedding (including the geo-distance embedding 132 and the union embedding 134), the target object feature embedding 136, and the reference object feature embedding 138.

The pair embedding generation engine 120 repeats the above process for each target-reference pair to generate a plurality of target-reference pair embeddings 130 for the network input.

The distance estimation engine 140 generates the distance estimate 150 for the target object by processing the network input including the pair embeddings 130 using a neural network.

In some implementations, the distance estimation engine 140 first combines the pair embeddings 130 to generate a combined embedding 146, and processes the combined embedding 146 using one or more neural network layers, such as a multi-layer perceptron (MLP) 148, to generate the distance estimate 150.

In some implementations, the distance estimation engine 140 combines the pair embeddings by averaging the pair embeddings.

In some other implementations, the distance estimation engine 140 combines the pair embeddings by generating a respective attention weight 145 for each of the target-reference pair embeddings 130, and computing, as the combined embedding 146, a weighted sum of the pair embeddings with each pair embedding weighted by the respective attention weight for the pair embedding. This process can improve the performance for target distance estimation since it can take into account the different importance of different reference objects for distance estimation. For example, a vehicle in the bottom left region of the image is potentially less relevant when localizing a faraway car depicted in the top right corner portion of the image.

In order to guide the model to focus more on the most informative reference objects, the distance estimation engine 140 can use an attention-based module to generate the attention weights 145 for the weighted sum of the target-reference pair embeddings.

In some implementations, the distance estimation engine 140 updates the target-reference pair embeddings 130 to include both the local target-reference pair feature (from the target-reference pair embedding) as well as global features depicting higher-order relationships between the target-reference pairs.

In one particular example, the attention module includes a graph neural network followed by one or more neural network layers for generating global features of target-reference pair embeddings, and one or more additional neural network layers for generating, from the global features, attention weights for combining the target-reference pair embeddings.

More specifically, in this particular example, The distance estimation engine 140 processes an input graph indicating information of the pair embeddings using a graph neural network 142 to generate updated embeddings, and then processes the updated embeddings with additional neural network layers, such as an MLP and an average pooling layer, to generate a global embedding that includes the global features of the target-reference pairs. The input graph can include the target object and the reference objects as nodes in the graph, and further include edges connecting each target-object pair with the pair embedding as the edge features. Example techniques for applying a graph neural network to update the embeddings are described in "VectorNet: Encoding HD Maps and Agent Dynamics from Vectorized Representation," Gao, et al., arXiv: 2005.04259 [cs.CV], 2020, the entire content of which is hereby incorporated by reference.

The distance estimation engine 140 can combine, e.g., by concatenating, each original target-reference pair embedding with the global embedding to generate a respective global-local pair embedding for each target-reference pair. The distance estimation engine 140 then processes the global-local pair embeddings using one or more neural network layers, such as a fully-connected layer followed by a softmax layer 144, to generate the respective attention weights 145.

The distance estimation engine 140 generates the combined embedding 146 by combining the target-reference pair embeddings 130 by computing a weighted sum of the pair embeddings with each pair embedding weighted by the respective attention weight 145 for the pair embedding.

The distance estimation engine 140 then processes the combined embedding 146 using one or more neural network layers, e.g., an MLP 148, to generate the distance estimate 150.

Prior to using the neural network described above, i.e., a neural network that includes the neural networks 122, 142, 144, and 148, to localize target objects, the system 100 or another system can perform training of the neural network using training examples. Each training example can include an image of the scene, the respective bounding boxes for the target object and reference objects, distance measurements of the reference objects, and a ground-truth label for the target object distance. The training system can update network parameters of the neural networks in the system 100 using any appropriate optimizer for neural network training, e.g., SGD, Adam, or rmsProp based on a distance loss measuring the difference between the target distance estimate generated by the networks and the ground-truth label.

In some implementations, to encourage the model to learn the pairwise relationships between target and reference objects, the training system can use additional supervision for the training. For example, during the training stage, the training system can incorporate a relative (or residual) distance head for each target-reference pair embedding. The relative distance $\Delta d$ between the target object and the reference object can be used as additional supervision for updating the network parameters of the neural networks. Each relative distance head processes the respective target-reference pair embedding before the pair embeddings are combined, and generates a predicted relative distance $\Delta d$ between the target object and the respective reference object. The training system can supplement the distance loss with a loss measuring the difference between the predicted $\Delta d$ and a relative distance computed based on the ground-truth for updating the network parameters.

Figure 2:
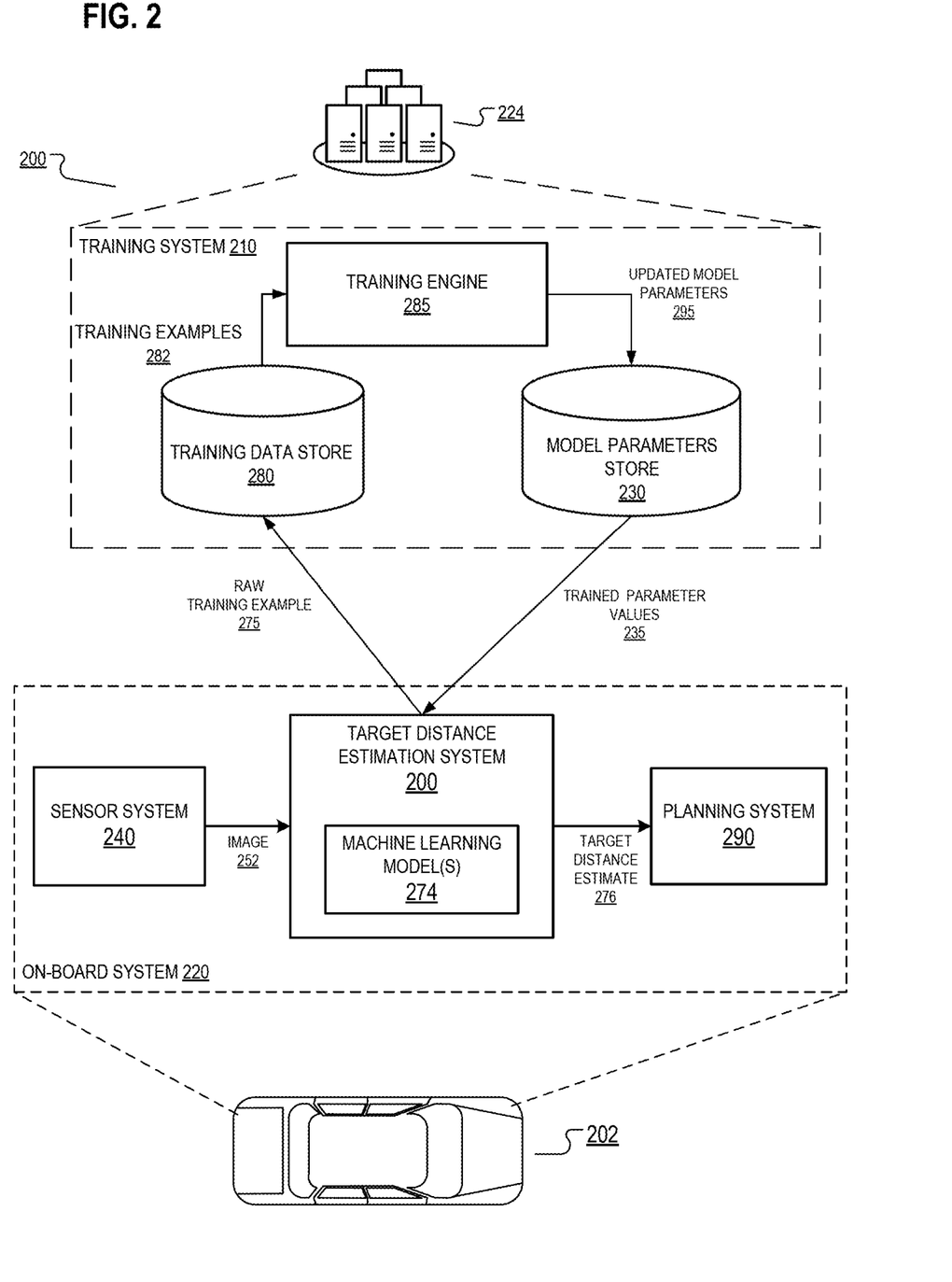
FIG. 2 shows an example on-board system.

FIG. 2 shows an example on-board system 220 and a training system 210.

The on-board system 220 is located on-board a vehicle 202 and makes control decisions for the autonomous vehicle. The on-board system 220 is composed of hardware and software components, some or all of which are physically located on-board a vehicle 202. The components of the on-board system 220 are described in more detail below.

In some cases, the on-board system 220 can make fully-autonomous or partly-autonomous driving decisions (i.e., driving decisions taken independently of the driver of the vehicle 202), present information to the driver of a vehicle 202 to assist the driver in operating the vehicle safely, or both. For example, in response to determining that a target object might interact with the vehicle 202, the on-board system 220 may autonomously apply the brakes of the vehicle 202 or otherwise autonomously change the trajectory of the vehicle 202 to prevent an unwanted interaction between the vehicle 202 and the target object.

Although the vehicle 202 in FIG. 2 is depicted as an automobile, and the examples in this document are described with reference to automobiles, in general the vehicle 202 can be any kind of vehicle. For example, besides an automobile, the vehicle 202 can be another kind of autonomous vehicle that travels along a roadway, e.g., a truck or a motorcycle. Moreover, the on-board system 220 can include components additional to those depicted in FIG. 2 (e.g., a collision detection system or a navigation system).

To enable the safe control of the autonomous vehicle 202, the on-board system 220 includes a sensor system 240 which enables the on-board system 220 to capture sensor data in the environment of the vehicle 202. More specifically, the sensor system 240 includes one or more sensors, some or all of which are configured to receive reflections of electromagnetic radiation from the environment of the vehicle 202. For example, the sensor system 240 can include a camera and one or more laser sensors (e.g., LIDAR laser sensors) that are configured to detect reflections of laser light. The sensor system 240 can generate an image of the environment that depict the target object and one or more reference objects.

The sensor system 240 continually (i.e., at each of multiple time points) captures raw sensor data which can indicate the directions, intensities, and distances travelled by reflected radiation. For example, a sensor in the sensor system 240 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 240 can also include a combination of components that receive reflections of electromagnetic radiation, e.g., LiDAR systems that detect reflections of laser light.

The sensor subsystems 240 or other components of the vehicle 202 can also classify groups of one or more raw sensor measurements from one or more sensors as being measures of another agent in the environment. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Thus, when an object is within the sensing range of the LiDAR sensor system, the sensor subsystems 240 can determine the distance of the object from the vehicle 202 using the sensor measurements generated by the LiDAR sensor system.

Each group of camera sensor measurements can be represented as an image, e.g., an RGB image. In some cases, because the range of the camera sensor is generally longer than the range of the LiDAR sensor system, certain objects that are detected in the image can be outside the range of the LiDAR sensor system. Therefore, the sensor subsystems 240 cannot directly use the LiDAR sensor system to localize these objects.

When an object detected in an image 252 generated by the camera sensor includes a target object that cannot be localized using the LiDAR sensor system, the sensor subsystems 240 can provide the image 252 to a target distance estimation system 200 on-board the vehicle 202.

The target distance estimation system 200 includes machine learning models 274 to process the image 252 to estimate a distance 276 of the target object from the vehicle 202. An example of the target distance estimation system and the machine learning models is described with reference to FIG. 1.

The planning system 290 can use the target distance estimate 276 to make fully-autonomous driving decisions, i.e., to update a planned trajectory for the vehicle 202. For example, the planning system 290 can generate a fully-autonomous plan to brake or change lanes if the target distance estimate 276 is below a threshold or, more generally, when a criterion that depends on the target distance estimate 276 is satisfied. In this example, the planning system 290 can generate fully-autonomous control outputs, e.g., to apply the brakes of the vehicle 202 causing the autonomous vehicle 202 to slow down and maintain a safe distance from the target object.

The fully-autonomous driving decisions generated by the planning system 290 can be implemented by a control system of the vehicle 202. For example, in response to receiving a fully-autonomous driving decision generated by the planning system 290 which indicates that the brakes of the vehicle should be applied, the control system may transmit an electronic signal to a braking control unit of the vehicle. In response to receiving the electronic signal, the braking control unit can mechanically apply the brakes of the vehicle.

The training system 210, which is generally located remotely from the on-board system 220, e.g., in a data center remote from the autonomous vehicle, generates trained parameter values 235 for the one or more machine learning models 274.

The training system 210 includes a training data store 280 that stores the training data used to train each of the machine learning models 274. The training data store 280 receives raw training examples from vehicles operating in the real world. For example, the training data store 280 can receive a raw training example 275 from the vehicle 202 that are in communication with the training system 210. Each raw training example 275 can be processed by the training system 210 to generate a new training example used to train one or more machine learning models 274.

The training data store 280 provides training examples 282 to a training engine 285, also housed in the training system 210. The training engine 285 uses the training examples 285 to update the model parameters of the machine learning model 274, and provides the updated model parameters 295 to the model parameters store 230. Once the parameter values of the model 274 have been fully trained, the training system 210 can send the trained parameter values 235 to the on-board system 220, e.g., through a wired or wireless connection.

The training system 210 is typically hosted within a data center 224, which can be a distributed computing system having hundreds or thousands of computers in one or more locations.

Figure 3A:
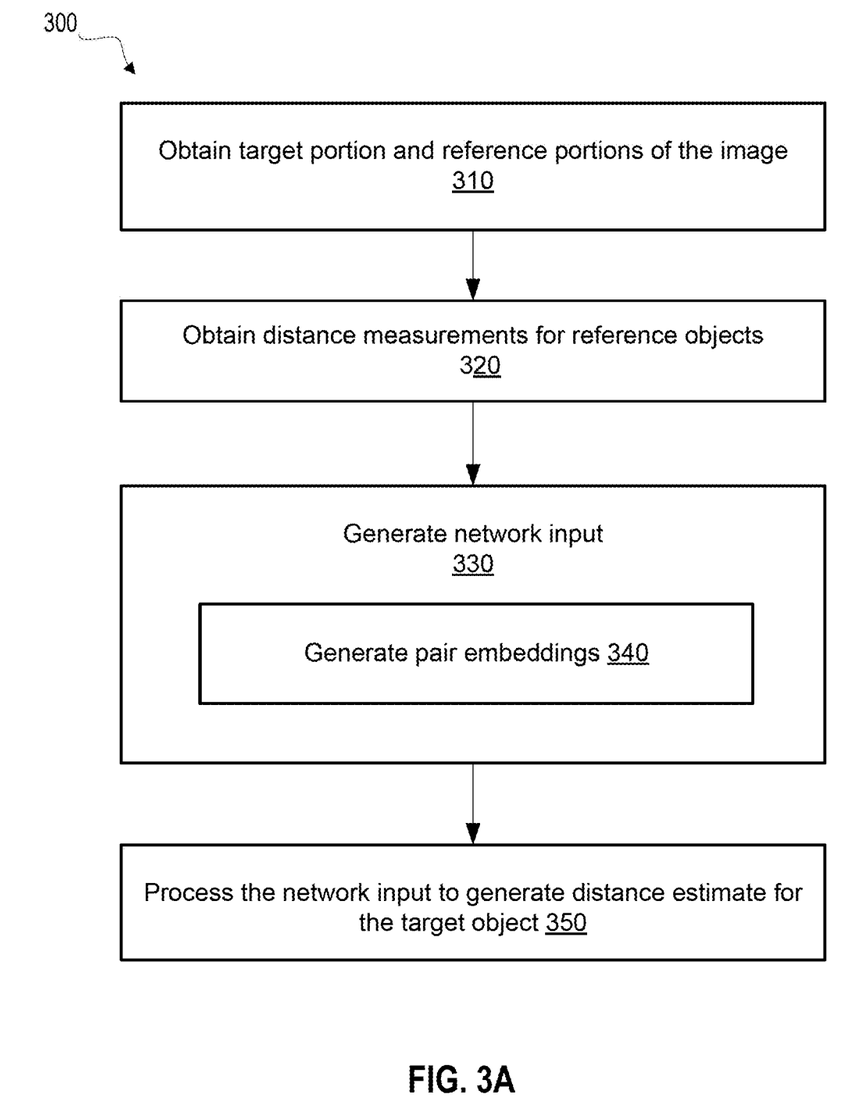
FIG. 3A is a flow diagram illustrating an example process for target distance estimation.

FIG. 3A is a flow diagram illustrating an example process 300 for performing target distance estimation. For convenience, the process 300 will be described as being performed by a system of one or more computers located in one or more locations. For example, a target distance estimation system, e.g., the target distance estimation system 100 of FIG. 1, appropriately programmed in accordance with this specification, can perform the process 300.

The goal of the process 300 is to estimate a distance for a target object that is depicted in an image of a scene in an environment.

In step 310, the system obtains data specifying (i) a target portion of the image that depicts the target object detected in the image, and (ii) one or more reference portions of the image that each depict a respective reference object.

In step 320, the system obtains, for each of the one or more reference objects, a respective distance measurement for the reference object that is a measurement of a distance from the reference object to a specified location in the environment.

In some implementations, the specified location is a location of the image sensor, e.g., a camera, that captured the image in the environment.

In some implementations, the respective distance measurements can be obtained from sensor readings of the scene in the environment, for example, having been generated by a LiDAR sensor.

In some implementations, some of the reference objects can be map features in the environment, and the respective distance measurements are obtained from map data for the scene in the environment.

In step 330, the system generates a network input from the portion of the image that depicts the target object, the respective portions of the image that depict each of the one or more reference objects, and the respective distance measurements for the reference objects.

In some implementations, the network input includes one or more pair embeddings with each pair embedding corresponding to a target-reference pair formed by the target object and one of the reference objects. In particular, the system performs step 340 to generate a respective target-reference pair embedding for each of the one or more pairs that each includes the target object and a respective one of the reference objects.

An example process for step 340 for generating the pair embeddings is described with reference to FIG. 3B. In the example process, the network input includes a plurality of respective target-reference pair embeddings for a plurality of target-reference pairs, each target-reference pair being formed by the target object and a respective one of a plurality of reference objects.

In general, each target-reference pair embedding can encode not only the features of the target object and the reference object, but also pairwise relationship between the target object and the reference object.

Figure 3B:
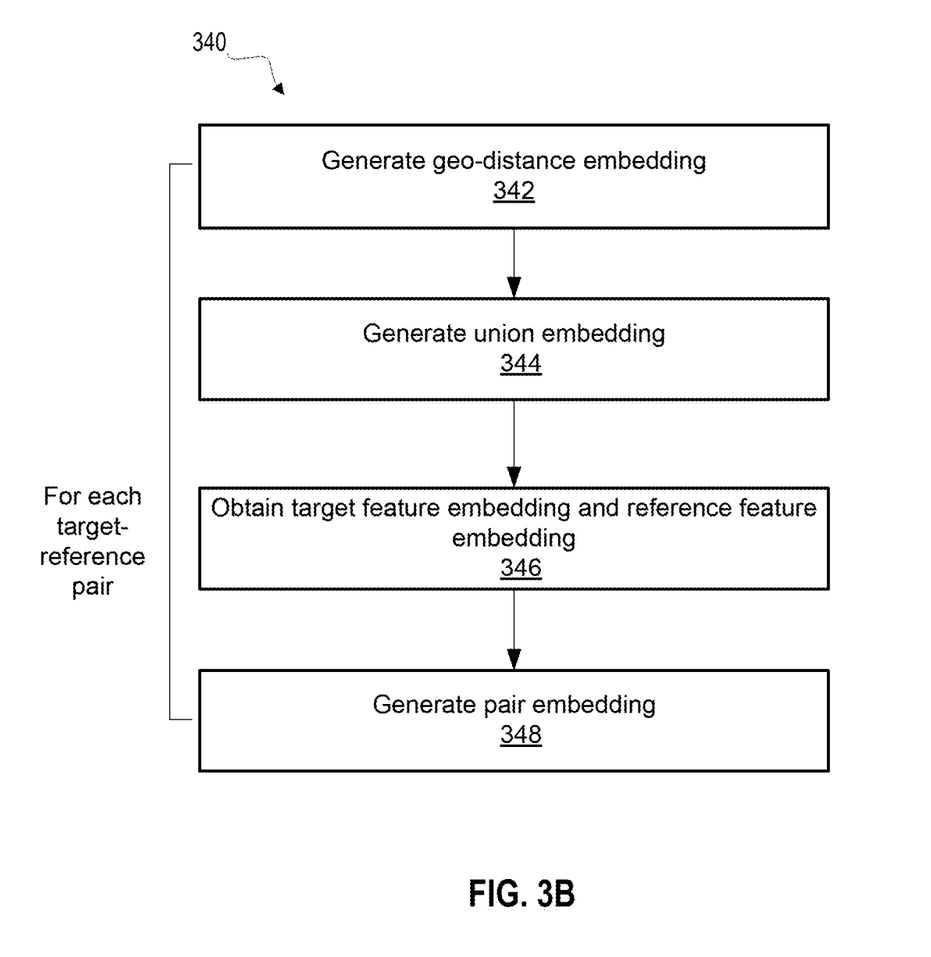
FIG. 3B is a flow diagram illustrating an example process for generating target-reference pair embeddings.

Referring to FIG. 3B, the system performs steps 342-348 for each target-reference pair to generate the respective target-reference pair embedding.

In step 342, the system generates a geo-distance embedding that encodes the geo-distance relationship between the target object and the reference object. Concretely, the system generates an embedding input, and processes the embedding input using one or more neural network layers to generate the geo-distance embedding.

The embedding input includes data indicating properties of the target portion and the reference portion for the reference object in the pair, as well as the distance measurement for the reference object in the pair.

In some implementations, the properties include one or more of: a relative position shift between center coordinates of a center of the target portion and a center of reference portion, or a relative scale between a size of the target portion and a size of the reference portion In some implementations, the one or more neural network layers for processing the embedding input to generate the geo-distance embedding are a multi-layer perceptron (MLP).

In step 344, the system generates the union embedding for the target-reference pair. Concretely, the system identifies a union bounding box that is a portion of the image that includes both the target portion and the reference portion for the reference object in the pair. The system then generates the union embedding by processing the union bounding box using a feature extraction neural network.

The system can generate the pairwise embedding for the target-reference pair by combining, e.g., concatenating, the geo-distance embedding and the target-reference union embedding.

In step 346, the system obtains respective feature embeddings for the target object and the reference object in the target-reference pair. The target object feature embedding for the target object includes features extracted from the portion of the image depicting the target object. The reference object feature embedding for the reference object includes features extracted from the portion of the image depicting the reference object.

In step 348, the system generates the pair embedding by combining, e.g., by concatenating, the pairwise embedding (including the geo-distance embedding and the union embedding), the target object feature embedding, and the reference object feature embedding.

The system repeats steps 342-348 for each target-reference pair to generate the plurality of target-reference pair embeddings for the network input.

Referring back to FIG. 3A, in step 350, the system generates the distance estimate for the target object by processing the network input using a neural network. The distance estimate for the target object is an estimate of a distance from the target object to the specified point in the environment.

In some implementations, the step 350 for generating the target distance estimate includes combining the pair embeddings to generate a combined embedding, and processing the combined embedding using one or more neural network layers to generate the distance estimate.

In some implementations, the system combines the pair embeddings by averaging the pair embeddings.

In some other implementations, the system combines the pair embeddings by generating a respective attention weight for each of the target-reference pair embeddings, and computing a weighted sum of the pair embeddings with each pair embedding weighted by the respective attention weight for the pair embedding.

An example process for step 350 for generating the target distance estimate is described with reference to FIG. 3C.

Figure 3C:
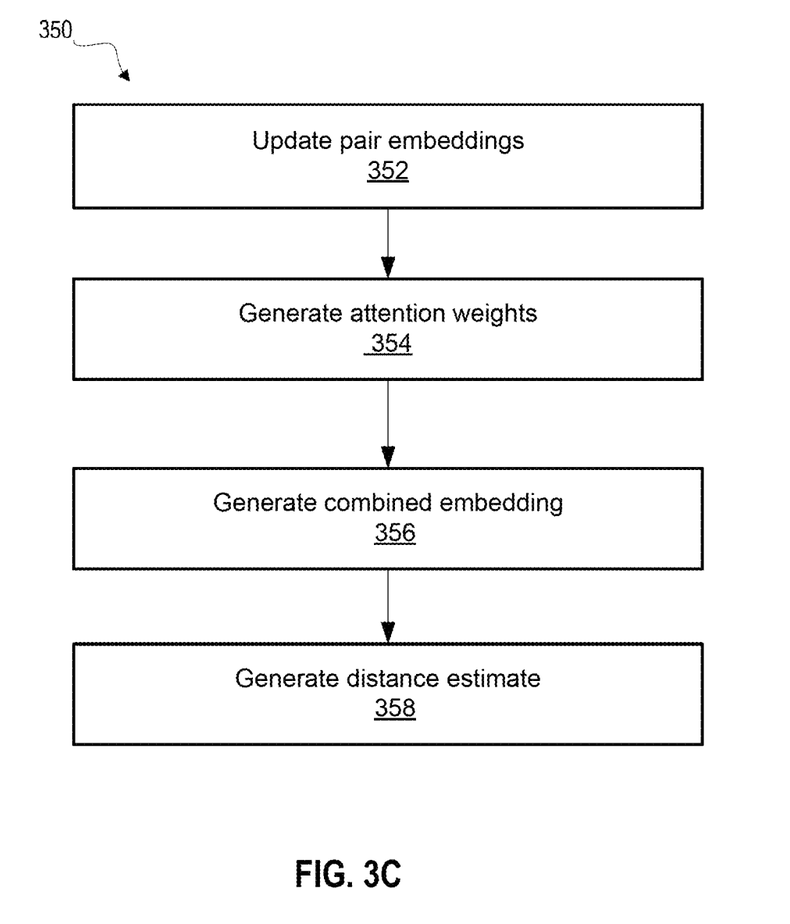
FIG. 3C is a flow diagram illustrating an example process for generating target distance estimate from target reference pair embeddings.

Referring to FIG. 3C, in step 352, the system updates the target-reference pair embeddings.

In one particular example, the system can process a graph input including information of the pair embeddings using a graph neural network to generate updated embeddings, and then process the updated embeddings with an MLP and average pooling to generate a global embedding that includes the global features of the target-reference pairs. The system can combine, e.g., by concatenating, each original target-reference pair embedding with the global embedding to generate the respective global-local pair embedding.

In step 354, the system processes the global-local pair embeddings using one or more neural network layers to generate the respective attention weights.

For example, the one or more neural network layers can include a fully-connected layer followed by a softmax layer.

In step 356, the system generates a combined embedding by combining the target-reference pair embeddings by computing a weighted sum of the pair embeddings with each pair embedding weighted by the respective attention weight for the pair embedding.

In step 358, the system processes the combined embedding using one or more neural network layers to generate the distance estimate.

For example, the one or more neural network layers can include a multi-layer perceptron (MLP).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for generating a distance estimate for a target object that is depicted in an image obtained by a camera sensor capturing a scene in an environment, the method comprising:
    obtaining data specifying (i) a target portion of the image that depicts the target object detected in the image, and (ii) a plurality of reference portions of the image that each depicts a respective reference object, wherein each of the plurality of reference objects is within a range of a LiDAR sensor, and the target object is outside the range of the LiDAR sensor;
    obtaining, for each of the plurality of reference objects, a respective distance measurement from the LiDAR sensor for the reference object that is a measurement of a distance from the reference object to a specified location in the environment;
    generating a plurality of pair embeddings from the portion of the image that depicts the target object, the respective portions of the image that depict each of the reference objects, and the respective distance measurements from the LiDAR sensor for the reference objects, wherein the plurality of pair embeddings comprises, for each of the plurality of reference objects, a respective pair embedding of a respective object pair that includes the target object and the reference object; and
    processing the plurality of pair embeddings using a neural network to generate an estimated distance of the target object that is outside the range of the LiDAR sensor from the specified location in the environment.

2. The method of claim 1, wherein the respective reference objects are map features in the environment and wherein the distance measurements are obtained from map data for the scene in the environment.

3. The method of claim 1, wherein generating the respective pair embedding comprises, for each of the pairs:
    generating a pairwise embedding for the pair.

4. The method of claim 3, wherein the pairwise embedding includes a geo-distance embedding, and wherein generating the geo-distance embedding comprises:
    generating an embedding input from properties of the target portion and the reference portion for the reference object in the pair and the distance measurement for the reference object in the pair; and
    generating the geo-distance embedding by processing the embedding input using one or more neural network layers.

5. The method of claim 4, wherein the properties include one or more of:
    a relative position shift between center coordinates of a center of the target portion and a center of reference portion; or
    a relative scale between a size of the target portion and a size of the reference portion.

6. The method of claim 4, wherein the one or more neural network layers are an MLP.

7. The method of claim 4, wherein the pairwise embedding includes a union embedding, and wherein generating the union embedding comprises:
    identifying a union bounding box that is a portion of the image that includes both the target portion and the reference portion for the reference object in the pair; and
    generating the union embedding by processing the union bounding box using a feature extraction neural network.

8. The method of claim 7, wherein the pairwise embedding is a concatenation of the geo-distance embedding and the target-reference union embedding.

9. The method of claim 8, wherein the pair embedding includes:
    a target object feature embedding for the target object that includes features extracted from the portion of the image depicting the target object; and
    a reference object feature embedding for the reference object in the pair that includes features extracted from the portion of the image depicting the reference object.

10. The method of claim 9, wherein processing the pair embeddings using a neural network to generate a distance estimate for the target object that is an estimate of a distance from the target object to the specified point in the environment comprises:
  combining the pair embeddings to generate a combined embedding; and
  processing the combined embedding using one or more neural network layers to generate the distance estimate.

11. The method of claim 10, wherein the one or more neural network layers are a multi-layer perceptron (MLP).

12. The method of claim 10, wherein combining the pair embeddings to generate a combined embedding comprises: averaging the pair embeddings.

13. The method claim 10, wherein combining the pair embeddings to generate a combined embedding comprises:
  generating a respective attention weight for each of the pair embeddings; and
  computing a weighted sum of the pair embeddings with each pair embedding weighted by the respective attention weight for the pair embedding.

14. The method of claim 13, wherein generating a respective attention weight for each of the pair embeddings comprises:
  processing the pair embeddings using a graph neural network to generate a respective updated pair embedding for each pair; and
  processing the updated pair embeddings using one or more neural network layers to generate the respective attention weights.

15. The method of claim 14, wherein the one or more neural network layers are a fully-connected layer followed by a softmax layer.

16. A system comprising:
  one or more computers; and
  one or more storage devices storing instructions that, when executed by the one or more computers, cause the one or more computers to perform a method for generating a distance estimate for a target object that is depicted in an image obtained by a camera sensor capturing a scene in an environment, the method comprising:
    obtaining data specifying (i) a target portion of the image that depicts the target object detected in the image, and (ii) a plurality of reference portions of the image that each depicts a respective reference object, wherein each of the plurality of reference objects is within a range of a LiDAR sensor, and the target object is outside the range of the LiDAR sensor;
    obtaining, for each of the plurality of reference objects, a respective distance measurement from the LiDAR sensor for the reference object that is a measurement of a distance from the reference object to a specified location in the environment;
    generating a plurality of pair embeddings from the portion of the image that depicts the target object, the respective portions of the image that depict each of the reference objects, and the respective distance measurements from the LiDAR sensor for the reference objects, wherein the plurality of pair embeddings comprises, for each of the plurality of reference objects, a respective pair embedding of a respective object pair that includes the target object and the reference object; and
    processing the plurality of pair embeddings using a neural network to generate an estimated distance of the target object that is outside the range of the LiDAR sensor from the specified location in the environment.

17. One or more non-transitory computer-readable storage media storing instructions that when executed by one or more computers cause the one or more computers to perform a method for generating a distance estimate for a target object that is depicted in an image obtained by a camera sensor capturing a scene in an environment, the method comprising:
  obtaining data specifying (i) a target portion of the image that depicts the target object detected in the image, and (ii) a plurality of reference portions of the image that each depicts a respective reference object, wherein each of the plurality of reference objects is within a range of a LiDAR sensor, and the target object is outside the range of the LiDAR sensor;
  obtaining, for each of the plurality of reference objects, a respective distance measurement from the LiDAR sensor for the reference object that is a measurement of a distance from the reference object to a specified location in the environment;
  generating a plurality of pair embeddings from the portion of the image that depicts the target object, the respective portions of the image that depict each of the reference objects, and the respective distance measurements from the LiDAR sensor for the reference objects, wherein the plurality of pair embeddings comprises, for each of the plurality of reference objects, a respective pair embedding of a respective object pair that includes the target object and the reference object; and
  processing the plurality of pair embeddings using a neural network to generate an estimated distance of the target object that is outside the range of the LiDAR sensor from the specified location in the environment.

* * * * *